United States Patent [19]

Prakken

[11] Patent Number: 5,605,031
[45] Date of Patent: Feb. 25, 1997

[54] DEVICE FOR PACKING FILLED BAGS IN CASES

[76] Inventor: Bouwe Prakken, Spijkerlaan 9, NL-3471 EG, Kamerik, Netherlands

[21] Appl. No.: 596,128

[22] PCT Filed: Aug. 16, 1994

[86] PCT No.: PCT/NL94/00194

§ 371 Date: Feb. 8, 1996

§ 102(e) Date: Feb. 8, 1996

[87] PCT Pub. No.: WO95/05312

PCT Pub. Date: Feb. 23, 1995

[30] Foreign Application Priority Data

Aug. 19, 1993 [NL] Netherlands ............................ 9301436

[51] Int. Cl.⁶ ....................................................... B65B 5/08
[52] U.S. Cl. .................................. 53/537; 53/244; 53/247; 53/538; 294/65; 414/416
[58] Field of Search ............................... 53/244, 247, 537, 53/538, 540, 544; 414/416; 294/65

[56] References Cited

U.S. PATENT DOCUMENTS

| 3,435,584 | 4/1969 | Prechter . | |
|---|---|---|---|
| 3,774,778 | 11/1973 | Flaig | 53/247 X |
| 3,859,772 | 1/1975 | Thierion | 53/544 X |
| 4,117,648 | 10/1978 | Goodman | 53/537 |
| 4,397,130 | 8/1983 | Thierion | 53/247 X |
| 4,402,173 | 9/1983 | Thierion | 53/247 X |
| 4,611,458 | 9/1986 | Prakken | 53/247 X |
| 4,776,148 | 10/1988 | Mingozzi | 53/544 X |
| 4,800,703 | 1/1989 | Goodman | 53/244 X |
| 5,044,143 | 9/1991 | Ako et al. | 53/247 X |
| 5,079,903 | 1/1992 | Hakansson | 53/247 X |

FOREIGN PATENT DOCUMENTS 2158029 11/1985 United Kingdom .

*Primary Examiner*—Daniel Moon
*Attorney, Agent, or Firm*—Young & Thompson

[57] ABSTRACT

A device for packing filled bags in outers comprises means (1, 3) for placing the bags in a row in such a way that they overlap each other, a suction box (8) with suction cups (13, 14) for retaining filled bags, which suction box can be moved between a pick-up position above the means for forming a row and a delivery positon above an outer or device for feeding in an outer, and means (4, 6) for pushing a formed row of bags up against the suction cups of the suction box. The suction box (8) has one or more rows of suction cups (13) having mouths placed relatively high up and one or more rows of suction cups having mouths placed relatively low down. In a tint pick-up position of the suction box, the suction cups having mouths placed high up are positioned directly above the means for forming a row of bags, and in a second pick-up position of the suction box, the suction cups having mouths placed relatively low down are situated directly above the means for forming a row of bags.

1 Claim, 5 Drawing Sheets

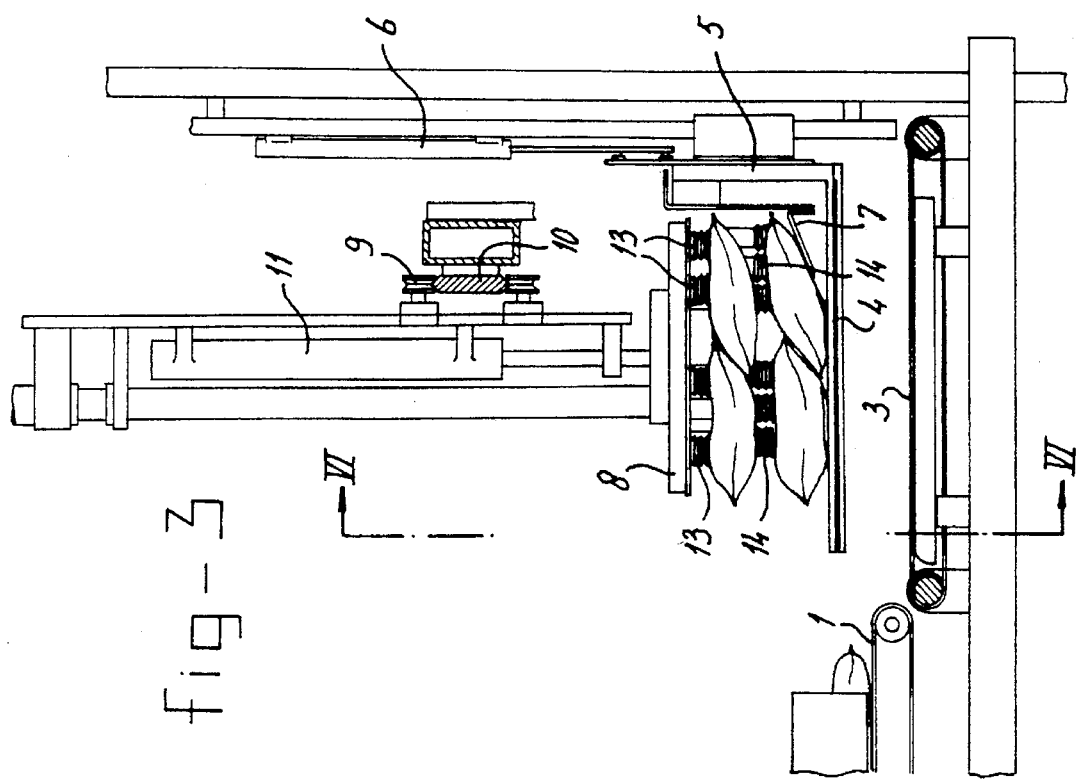

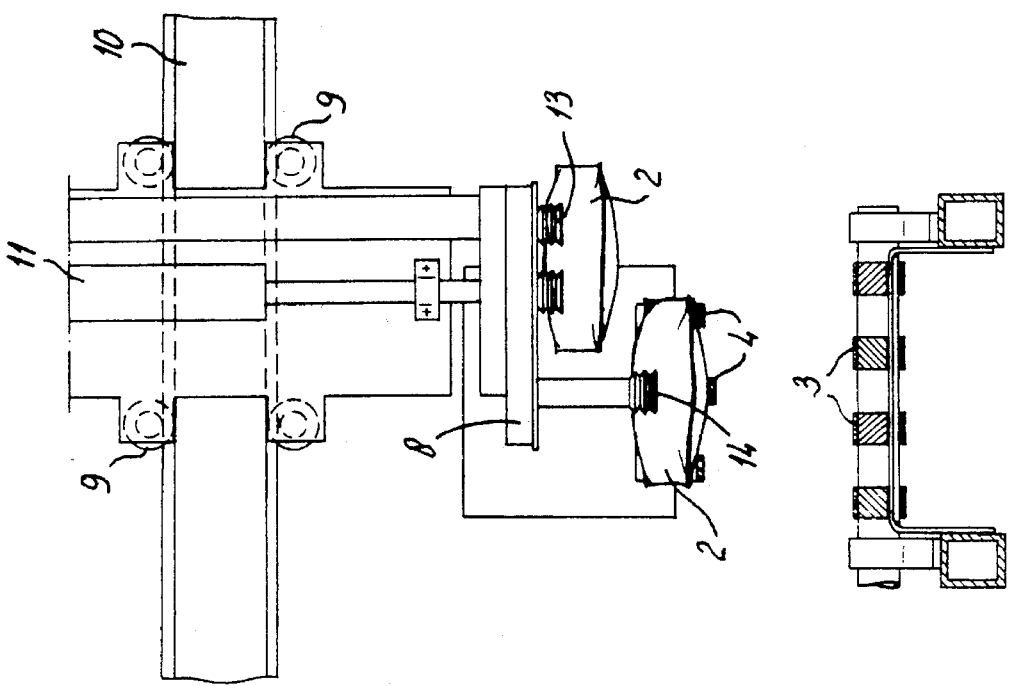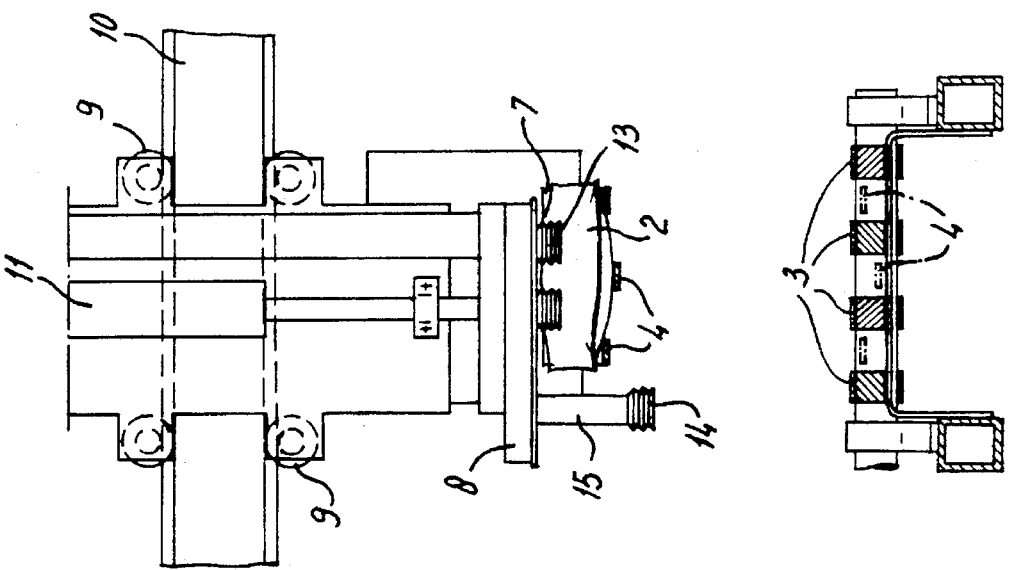

DEVICE FOR PACKING FILLED BAGS IN CASES

The invention relates to a device for packing filled bags in cases, comprising:

means for placing the bags in a row in such a way that they overlap each other, a suction box provided with suction cups for retaining the filled bags, which suction box can be moved between a pick-up position above the above mentioned means for forming a row and a delivery position above a case or device for feeding in a case, and means for pushing a formed row of bags up against the suction cups of the suction box, Such a device is known from GB-B-2158029.

The suction box of this device is suitable for picking up, moving horizontally and delivering a single row of overlapping bags. In order to deposit two rows of bags in a case, the suction box has to move back and forth twice between the pick-up and the delivery position, which means a relatively long cycle time. The bags are normally deposited in a case in such a way that the rows overlap each other at right angles to the lengthwise direction of the rows. This therefore means that the bags of a row overlap each other in two directions at right angles to each other. It has been found that there is a risk here that the bags of each layer will go into an upward slanting position at right angles to the lengthwise direction of the rows and that the various layers stacked on top of each other will not lie flat on top of each other.

The object of the invention is to make a change in the design of the known device which leads to a shorter cycle time and to layers of bags being deposited lying flat on top of each other in a case.

For this purpose, the suction box according to the invention is provided with first and second rows of suction cups parallel with respect to the feed direction of the bags, the mouths of the first row or rows on the one hand being distanced in the vertical direction from the mouths of the second row or rows of suction cups by a vertical height being substantially equal to or larger than the thickness of a filled bag, and on the other being distanced in the horizontal direction by a length smaller than the width of a filled bag as seen perpendicular to a row of collected bags, that the suction box is connected to a part which is movable between a first pick-up position and a second pick-up position, the distance between the first and second pick-up positions substantially corresponding to the horizontal distance between the first and second rows of suction cups so as to provide a densely packed layer of bags which overlap each other in two directions perpendicular to each other.

The distance between the first and second pick-up position should be slightly smaller than the width of a bag, so that successive rows of bags hanging from the suction box overlap each other.

Two rows of bags, for example, are always deposited overlapping each other in the crosswise direction in a case, and it has been found that, although those bags overlap each other in a case in two directions at right angles to each other, the layers still lie flat on top of each other. The invention therefore leads to a gain in time and a gain in space in the outers.

It is not out of the question for more than two rows of suction cups to be connected at different levels to the suction box.

The invention will now be explained in greater detail with reference to the figures.

FIG. 2 shows a side view after a first row of bags has been pushed against a row of suction cups situated high up.

FIG. 3 shows a side view after a second row of bags has been pushed against a row of suction cups situated low down.

FIG. 5 shows a section along the line V—V in FIG. 2.

FIG. 6 shows a section along the line VI—VI in FIG. 3.

Figure 1:
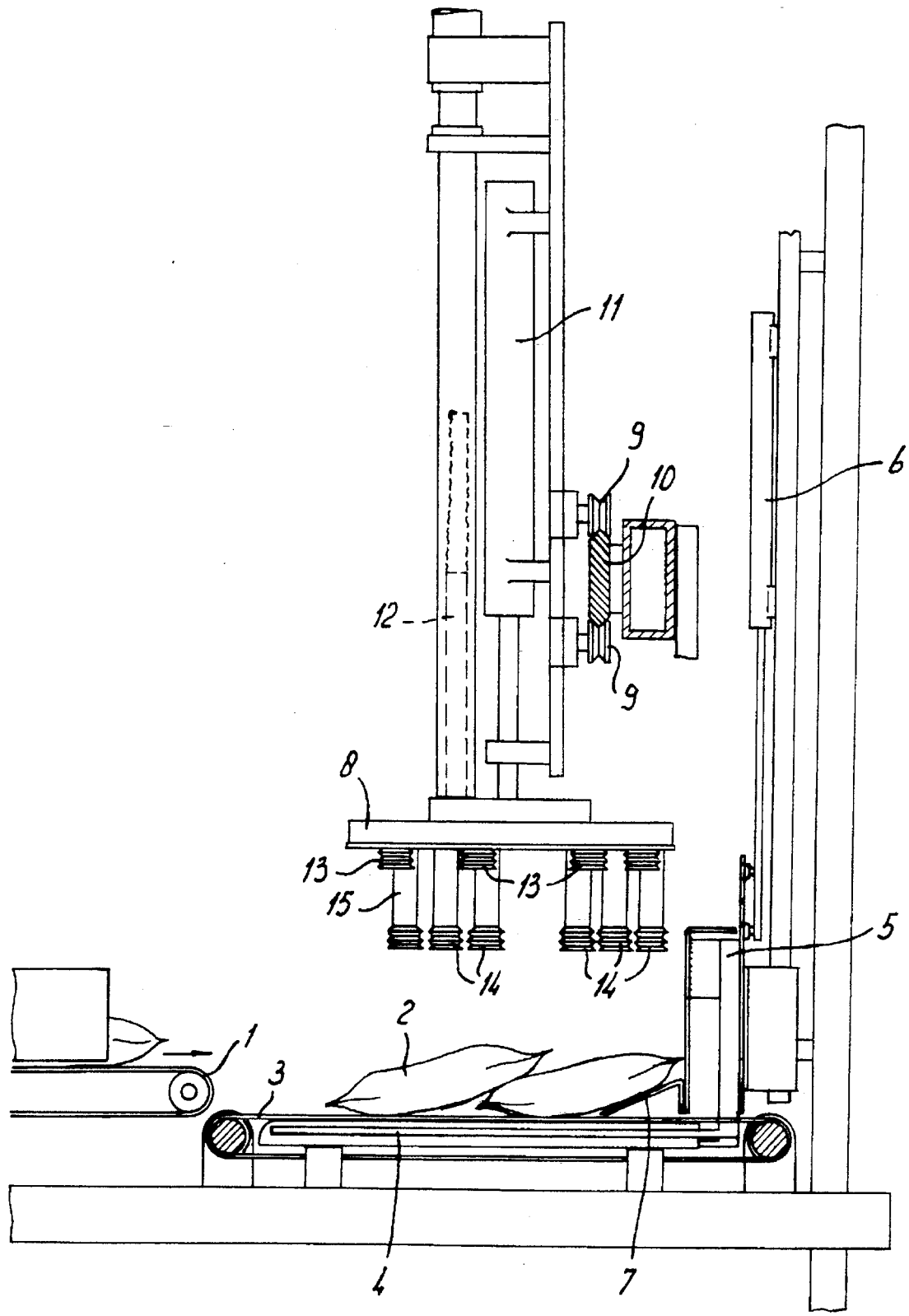
FIG. 1 shows a side view of the device according to the invention during the formation of a row of filled bags.
Figure 4:
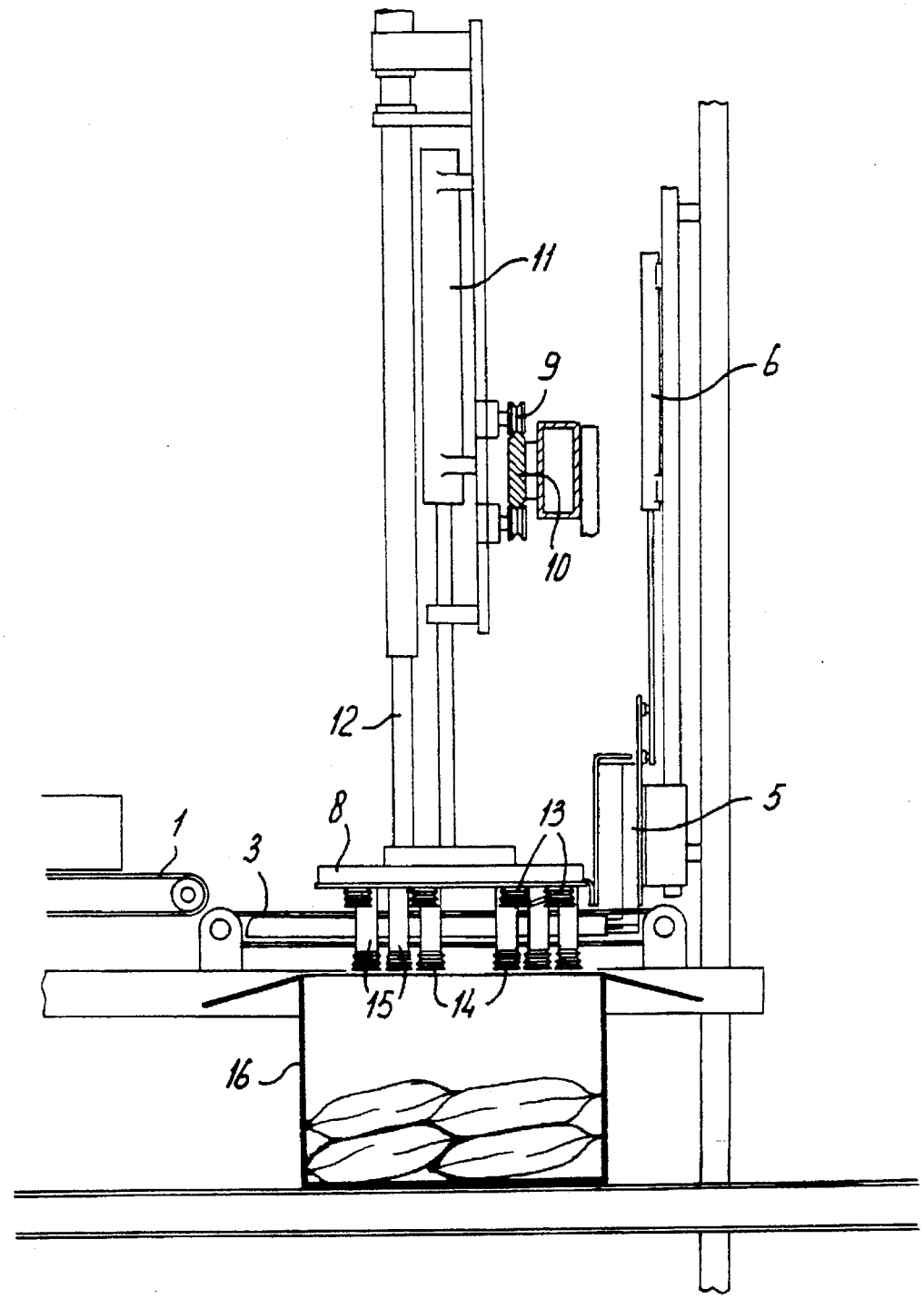
FIG. 4 shows a side view after two layers, each formed from two rows of bags, have been deposited in an outer.

The device shown comprises a feed conveyor 1 for feeding in filled bags 2, for example bags filled with crisps, to a number (four) of adjacent conveyor belts 3, on which a row of overlapping bags can form.

In FIGS. 1 to 7a each row consists of two relatively large bags. Of course, there can also be more than that.

Strips 4, which are connected to an element 5 which can be moved up and down by means of a pneumatic cylinder 6, are placed between the belts 3. A slanting run-on surface 7 is fixed to the element 5, in order to ensure that the bag which goes onto the belts 3 first assumes the same slanting position as the following bag.

A suction box 8 is disposed above the belts 3, which suction box can be moved horizontally by guide means 9 along a rail 10 and can be moved in the vertical direction by means of a pneumatic cylinder 11. The suction box 8 is connected by means of a pipe and/or hose 12 to a vacuum pump (not shown).

The inside of the suction box is connected to a number of suction cups 13, 14. The suction cups 14 are fixed to the bottom side of the pipes 15, while the suction cups 13 are fixed directly to the suction box or to pipes shorter than the pipes 15.

The device works as follows:

When a row of overlapping bags has collected on the belts B, the strips 4 are moved upwards by means of the pneumatic cylinder 6, with the result that the bags are pushed against the suction cups 13 (FIGS. 2 and 5) and are held by suction. The suction box 8 is then moved horizontally along a length which is slightly smaller than the width of a bag to the position shown in FIG. 6. In the meantime, the strips 4 are returned to their initial position between the belts B, and a new row of overlapping bags is formed on the belts 3. Moving the strips 4 up again by means of the pneumatic cylinder 6 causes the second row of bags to be pushed against the suction cups 14 (FIGS. 3 and 6). The rows of bags overlap each other.

While the strips 4 are returning to the initial position and a new first row is being formed, the suction box moves with the two rows of bags retained by the suction cups 13, 14 in the horizontal direction to a position directly above a case 16 which is brought in by a case conveyor. Moving the suction box 8 downwards by means of the pneumatic cylinder and breaking the vacuum (or temporarily replacing it by compressed air) causes a layer consisting of two overlapping rows of overlapping bags to be deposited in a case. Further layers are deposited in the outer 16 in the same way (see FIG. 4).

The layers come to rest in a nice flat layer in a case. What is essential is that the first row of bags should be pushed onto suction cups 13 which are placed relatively high up, and the next row of bags onto suction cups 14 which are placed relatively low down, in which case the two rows overlap each other, as can be seen in FIG. 6.

Figure 7A:
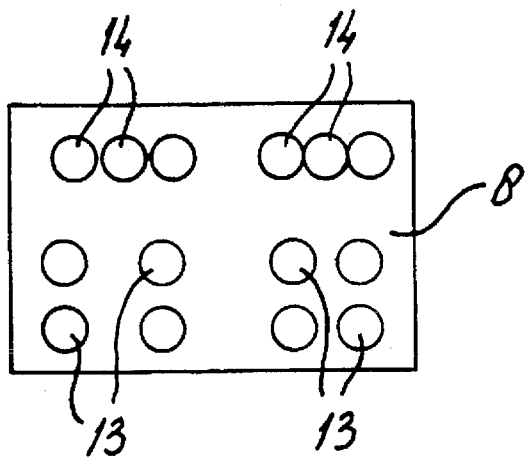
FIG. 7a shows a bottom view of the suction box used in the case of the device according to FIGS. 1 to 6.
Figure 7B:
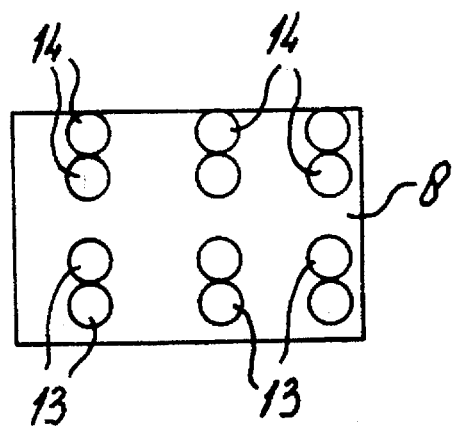
FIG. 7b shows a bottom view of an alternative embodiment of a suction box intended for slightly smaller bags.

The bottom view of the suction box shown in FIG. 7a corresponds to the arrangement of the suction cups shown in the previous figures. The arrangement shown in FIG. 7b is intended in particular for smaller bags in the case of which a row consists of three overlapping bags. It is also possible to have more rows of suction cups at different levels.

I claim:

1. Device for packing filled bags in cases, comprising:

means for placing the bags in a row in such a way that they overlap each other, a suction box provided with suction cups for retaining the filled bags, which suction box can be moved between a pick-up position above the above mentioned means for forming a row and a delivery position above a case or device for feeding in a case, and means for pushing a formed row of bags up against the suction cups of the suction box, characterized in that the suction box (8) is provided with first and second rows of suction cups (13, 14) parallel with respect to the feed direction of the bags, the mouths of the first row or rows on the one hand being distanced in the vertical direction from the mouths of the second row or rows of suction cups by a vertical height being substantially equal to or larger than the thickness of a filled bag, and on the other being distanced in the horizontal direction by a length smaller than the width of a filled bag as seen perpendicular to a row of collected bags, that the suction box is connected to a part which is movable between a first pick-up position and a second pick-up position, the distance between the first and second pick-up positions substantially corresponding to the horizontal distance between the first and second rows of suction cups so as to provide a densely packed layer of bags which overlap each other in two directions perpendicular to each other.

* * * * *